United States Patent
Chenus et al.

(10) Patent No.: US 7,454,289 B2
(45) Date of Patent: Nov. 18, 2008

(54) METHOD OF IMPROVING THE DETERMINATION OF THE ATTITUDE OF A VEHICLE WITH THE AID OF SATELLITE RADIONAVIGATION SIGNALS

(75) Inventors: Marc Chenus, Saint-Peray (FR); Marc Revol, Upie (FR)

(73) Assignee: Thales, Neuilly-sur-Seine (FR)

( * ) Notice: Subject to any disclaimer, the term of this patent is extended or adjusted under 35 U.S.C. 154(b) by 731 days.

(21) Appl. No.: 10/499,199

(22) PCT Filed: Dec. 17, 2002

(86) PCT No.: PCT/FR02/04397

§ 371 (c)(1),
(2), (4) Date: Jun. 18, 2004

(87) PCT Pub. No.: WO03/054576

PCT Pub. Date: Jul. 3, 2003

(65) Prior Publication Data

US 2005/0043887 A1    Feb. 24, 2005

(30) Foreign Application Priority Data

Dec. 20, 2001    (FR) .................................. 01 16561

(51) Int. Cl.
*G01S 5/00* (2006.01)

(52) U.S. Cl. ........................ 701/213; 342/350

(58) Field of Classification Search ................ 701/220, 701/216, 213, 211; 342/357.14, 350, 352, 342/357.01, 357.04, 357.11

See application file for complete search history.

(56) References Cited

U.S. PATENT DOCUMENTS

| | | | | |
|---|---|---|---|---|
| 5,185,610 A | * | 2/1993 | Ward et al. | 342/357.11 |
| 5,659,318 A | * | 8/1997 | Madsen et al. | 342/25 C |
| 6,005,514 A | * | 12/1999 | Lightsey | 342/365 |
| 6,061,631 A | | 5/2000 | Zhang | |
| 6,166,683 A | | 12/2000 | Hwang | |
| 6,259,398 B1 | | 7/2001 | Riley | |
| 6,313,789 B1 | * | 11/2001 | Zhodzishsky et al. | 342/357.12 |
| 6,317,078 B1 | | 11/2001 | Renard | |
| 6,516,021 B1 | * | 2/2003 | Abbott et al. | 375/150 |
| 7,162,367 B2 | * | 1/2007 | Lin et al. | 701/220 |

* cited by examiner

*Primary Examiner*—Dalena Tran
(74) *Attorney, Agent, or Firm*—Lowe Hauptman Ham & Berner, LLP

(57) ABSTRACT

The method in accordance with the invention, implemented with the aid of at least one pair of antennas, consists in performing: a normalized spectral analysis before intercorrelation of the demodulated signals (I, Q), by the code and the carrier, a phase coherence resetting of the signals before recombination, a phase offset measurement carried out by a true intercorrelation of the homologous satellite pathways by interferometry of the two signals arising from one and the same satellite and received respectively by a pair of antennas, then in performing a reduction of the initial ambiguity removal search domain for the determination of attitude of a vehicle by interferometric GPS measurement and implementing a statistical test for the selection of the ambiguity.

20 Claims, 5 Drawing Sheets

METHOD OF IMPROVING THE DETERMINATION OF THE ATTITUDE OF A VEHICLE WITH THE AID OF SATELLITE RADIONAVIGATION SIGNALS

CROSS-REFERENCE TO RELATED APPLICATIONS

The present Application is based on International Application No. PCT/FR02/04397, filed on Dec. 17, 2002, entitled "METHOD FOR IMPROVED DETERMINATION OF A VEHICLE ATTITUDE USING SATELLITE RADIONAVIGATION SIGNALS", which in turn corresponds to FR 01/16561 filed on Dec. 20, 2001, and priority is hereby claimed under 35 USC §119 and 35 USC §120 based on these applications. Each of these applications are hereby incorporated by reference in their entirety into this application.

FIELD OF THE INVENTION

The present invention pertains to a method of improving the determination of the attitude of a vehicle with the aid of satellite radionavigation signals.

DESCRIPTION OF THE RELATED ART

The determination of attitude with the aid of radionavigation signals, in particular of GPS signals, consists in comparing the differences in satellites/carrier distances with respect to a known baseline of antennas. Very high measurement resolution is therefore necessary. To achieve this resolution, measurements of phase of the GPS signal are used.

However, the determination of attitude by multi-antenna GPS thus carried out requires improvements in order to achieve the high level of integrity demanded by "safety-of-life" applications, that is to say vital safety demands.

Indeed, contrary to GPS positioning which utilizes the pseudo-distances delivered by the code tracking loop (Delay Locked Loop, DLL) on the basis of a single antenna, the determination of attitude utilizes the measurements of phases delivered by the carrier tracking loop (Phase Locked Loop, PLL) and in differential mode between antenna pair, this is manifested through a need for improvement of the following aspects:

- improvement of the operation of the PLL in the presence of disturbances (interference, structural or other multipaths, PLL phase jumps, etc.),
- improvement of the initialization of the determination of attitude (ambiguity removal), in particular for the reduction of the search domain, even by resorting to partial aid (with no heading aid) so as to reduce the initialization time and above all to achieve the necessary reliability by reducing the risk of error,
- improvement of the integrity of the GPS attitude (detection of errors).

An object of the invention is therefore the improvement of the determination of the attitude of a vehicle on the basis of a radionavigation signal, in particular of a GPS signal. The attitude of a carrier here includes the angles of heading, pitch and roll in a local terrestrial reference frame.

In the case of the determination of attitude, the GPS signal is received simultaneously by a pair (or pairs) of antennas, making it possible to establish the offset of the phases of the signals transmitted by the GPS satellites, which phases are measured respectively by each of the two antennas of the pair considered.

In the more conventional case of simple positioning, no attitude measurement, a GPS receiver tracks the GPS signal codewise with the aid of a DLL (thus measuring the pseudo-distance according to the position of the code received) and carrierwise with the aid of a PLL (measuring the pseudo-velocity according to the received phase velocity). A reception channel is dedicated to each satellite tracked. The DLL is therefore paramount for the function of location with respect to the PLL. The PLL may moreover momentarily be replaced with a velocity aid (so-called "code only" mode).

However, to determine an attitude, if one wished to compute the difference between pseudo-distances of the DLLs between two antennas, the resolution obtained would not be sufficient.

On the other hand, the comparison of the phases received arising from the PLLs makes it possible to achieve the necessary resolution. However, this differential measurement poses specific problems with respect to the conventional use of GPS positioning, which problems are:

- PLL less robust to interference than the DLL,
- measurement of phase modulo the wavelength, hence what is commonly referred to as "the ambiguity" of the determination of attitude by GPS,
- measurement of phase sensitive to PLL transients: noise, phase jump,
- differential measurement between antennas inducing particular sensitivity to local multipath (structural multipath, etc.).

To satisfy the attitude measurement need, in particular in the aeronautical sector, with the safety demands required, it appears necessary to improve the robustness and the accuracy of the phase measurements of the GPS signal, and to improve the removal of ambiguity and make it more reliable.

To improve the robustness and the accuracy of the phase measurements, during reception of the GPS signal, procedures for rejecting sources of interference by spectral or spatial processing applied to the input signal (before demodulation by the code or the carrier) are known. Moreover, the temporary replacing of the PLL by a velocity aid ("code only" mode) makes it possible to maintain the DLL for the positioning in case of strong interference, but the PLL no longer being operational, the phase measurements are no longer available for the measurement of attitude.

As far as the robustness of the GPS measurements with regard to multipaths is concerned, procedures at the DLL level are known; tight correlator, or inverse procedures based on a priori knowledge of the shape of the intercorrelation function of the local code and of the code received.

The contemporary solutions for processing interference mainly ensure the proper operation of the DLL part and of the GPS positioning (processing before demodulation, the so-called "code only" mode).

The measurement of phase and the determination of attitude are therefore not always available in case of strong interference even if the GPS positioning can be maintained.

Likewise, as far as the robustness of the GPS measurements with regard to multipaths is concerned, the known procedures do not make it possible to reject all the multipaths that may specifically degrade the attitude determination, in particular for low-delay multipaths that are undetectable by the known procedures at the DLL level (resolution of the DLL insufficient for the attitude measurement need).

Initializing the attitude determination, the ambiguity removal (LA) conditions the reliability of the whole of the subsequent utilization phase. The known methods of ambiguity removal proceed via maximum likelihood from among a set of potential solutions preselected or otherwise. Without a priori knowledge, these potential solutions describe a wide domain corresponding to a space whose dimension corresponds to the number of satellites processed per antenna pair, and having as half-axes the baseline length counted in terms of number of wavelengths, in all the directions of the search space.

The size of the search domain determines both the duration of the ambiguity removal and above all the risk of error in the initial attitude. To reduce the search domain, a known solution uses the intermodulation of two or three GPS carriers (L1× L2, L1×L5, . . . ) this having the effect of increasing the apparent wavelength. However, the accuracies sought may require the use of a baseline between antenna pairs of great length, even larger than the wavelength.

Aids are then commonly used to provide coarse initial attitudes and thus reduce the search space. For example:

an inertial reference system (IRS of class 2 Nmi/h) can provide the initial attitude (heading and vertical), accelerometers or level sensors can provide the initial pitch and/or initial roll (ICS of class 1 mg), a magnetometer (or a fluxgate) can provide an initial heading, etc.

The aid procedures for reducing the ambiguity removal search domain no longer apply if the heading is not available, the aid then being incomplete or partial (search for cost-optimized navigation system, with no IRS-2 Nmi/h, or magnetometer).

In the absence of reduction of the search domain, the integrity performance of the LA may be very insufficient: of the order of 1% when the need is $10^{-7}$.

In addition to the need to remove potential ambiguities, the contemporary procedure allows no knowledge of the quality of the ambiguity removal obtained, this being essential, however, before selecting the GNSS signals as source of attitude and of heading of the carrier.

An object of the present invention is a method of improving the determination of the attitude of a vehicle with the aid of radionavigation signals, which method makes it possible at one and the same time to perform this determination with the best possible resolution, without being sensitive either to interference or to multipaths.

SUMMARY OF THE INVENTION

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

The method in accordance with the invention, implemented with the aid of at least one pair of antennas, is characterized in that it consists in producing a carrier phase loop (PLL) by summing the two signals arising from a pair of antennas half a wavelength apart, these signals being rendered coherent before summation, in carrying out a measurement of phase offset with regard to the signals arising from a pair of antennas several wavelengths apart, going via the frequency domain, then in performing a reduction of the initial ambiguity removal search domain for the determination of attitude of a vehicle by interferometric GPS measurement and implementing a statistical test for the selection of the ambiguity.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

The present invention will be better understood on reading the description of a mode of implementation, taken by way of nonlimiting example and illustrated by the appended drawing, in which.

DETAILED DESCRIPTION OF THE INVENTION

The present invention is described hereinbelow with reference to the determination of the attitude of an aircraft with the aid of radionavigation signals transmitted by a constellation of GPS satellites, but it is of course obvious that it is not limited to this application alone, and that it may be implemented in respect of other kinds of vehicle, and that it may resort to other radionavigation signals.

Figure 1:
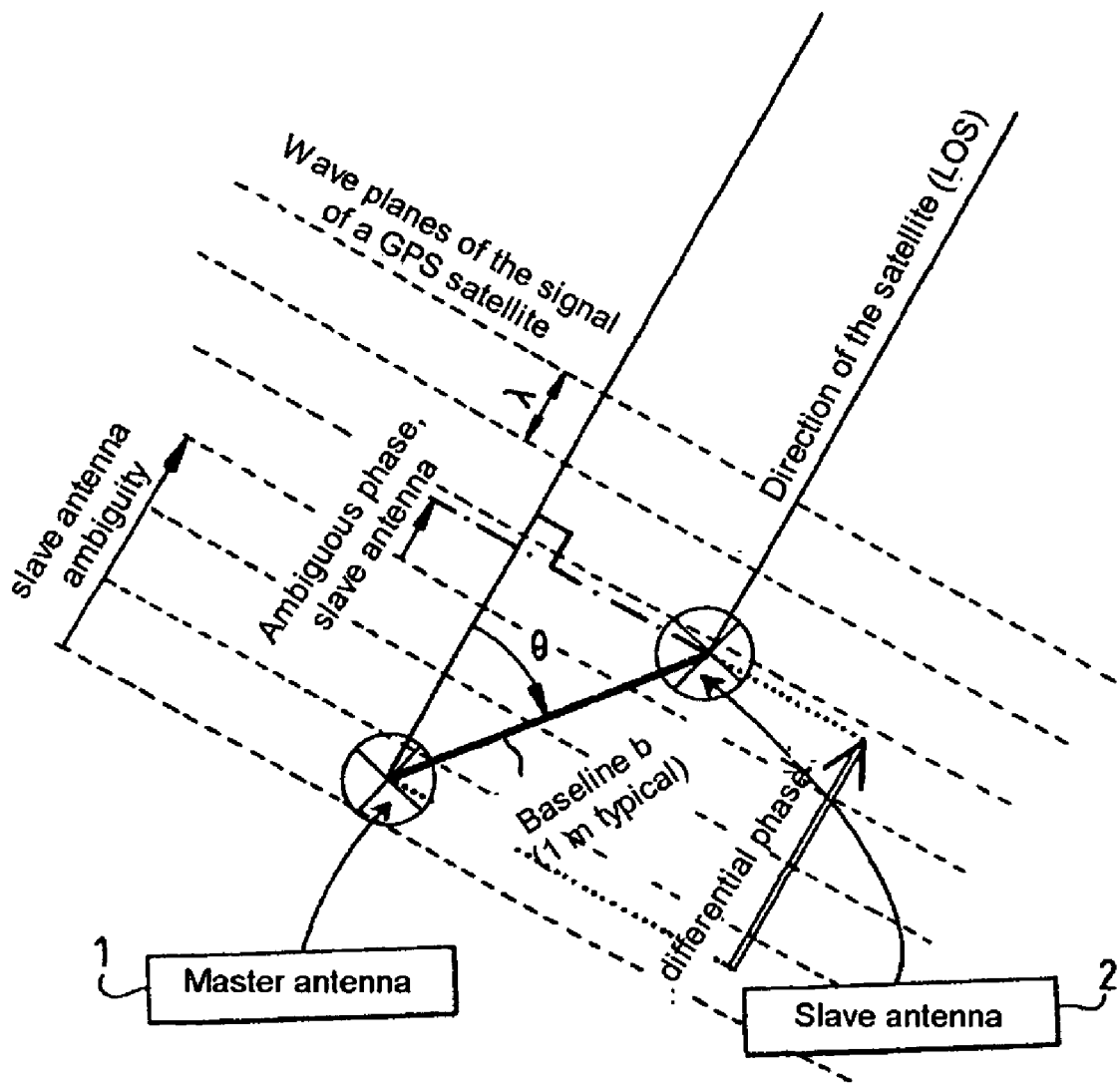
FIG. 1 is a schematic illustrating the difference in path length, viewed by a pair of antennas, of a GPS signal.

The difference in path length, viewed by an antenna pair, of the GPS signal is representative of the angle θ between the antenna baseline b and the direction (LOS) of the satellite, as shown by FIG. 1. This difference in path length is measured by the differential phase between the GPS antennas referenced 1 (master antenna) and 2 (slave antenna). Accordingly, the GPS delivers two ambiguous phase measurements (fractional part with respect to the wavelength) respectively for each antenna pair and for the relevant satellite in view. The various successive wave planes of the signal of the relevant satellite have been represented by broken lines.

Figure 2:
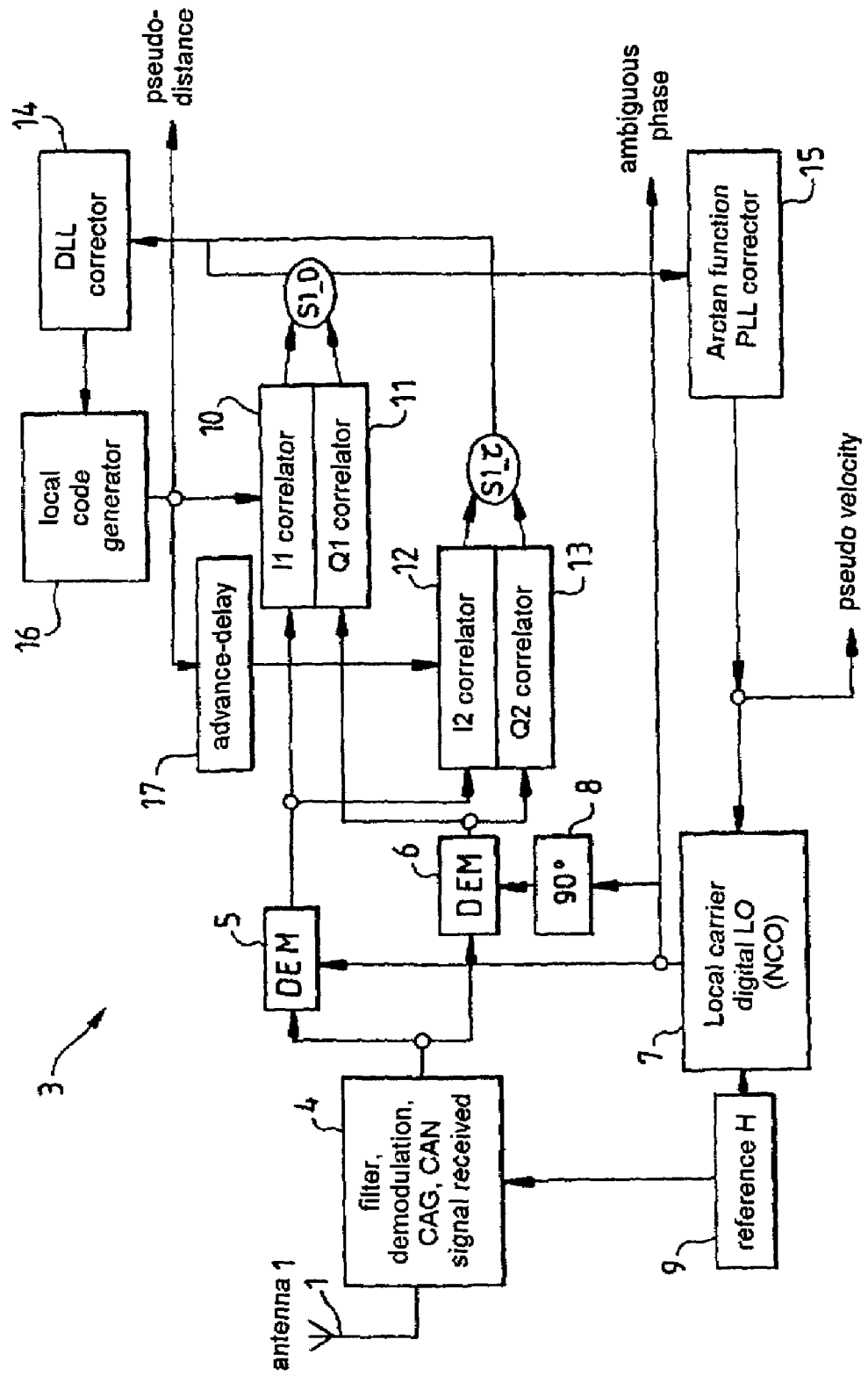
FIG. 2 is a block diagram of a GPS reception channel used by the method of the invention.

The difference in path length is defined geometrically by the projection (or the scalar product) of the antenna baseline length onto the direction of the relevant satellite:

$$\Delta\Phi=(n+\text{Fract})*\lambda=\overline{u}\cdot\overline{b},$$

with, $\Delta\Phi$, difference in path length, n, integer part (ambiguity),

Fract, fractional part, delivered by the GPS computer $\lambda$, wavelength $\overline{u}$, direction of the satellite, $\overline{b}$, antenna baseline length To deliver a phase measurement, a receiver receives and processes the GPS signal with the aid of a code tracking loop (DLL) and of a carrier tracking loop (PLL) as shown by FIG. 2, which pertains to a reception channel 3.

One of the antennas, for example the antenna 1, is followed by a circuit 4 comprising a demodulation filter, with automatic gain control and analog/digital conversion of the signal received. The circuit 4 feeds two demodulators 5 and 6. A digital local oscillator 7 feeds the demodulator 5 directly, and the demodulator 6 via a 90° phase shifter 8. A reference clock 9 is linked to the circuits 4 and 7. The demodulators 5 and 6 feed correlators I1 and Q1 referenced 10 and 11, and correlators I2 and Q2 referenced 12 and 13. The correlators 10 and 11 supply S1_0 to a DLL corrector circuit 14 and to a PLL corrector circuit 15 with arctan function, while the correlators 12 and 13 supply S1_τ to the circuit 14. The circuit 14 is linked to a local code generator 16 which is linked on the one hand via an advance/delay circuit 17 to the correlators 12 and 13, on the other hand directly to the correlators 10 and 11, and which supplies the pseudo-distance information. The corrector 15 is linked to the oscillator 7 and supplies the pseudo-velocity information. The ambiguous phase information is available at the output of the oscillator 7.

In the case of two antennas, the signals received demodulated by the code and the carrier may be written (neglecting the delay in the data):

$$r_1(t)=s_1(t)+n_1(t)=a \cdot D(t) \cdot \exp j(2\pi ft+\phi) + n_1(t)$$

$$r_2(t)=s_2(t)+n_2(t)=a \cdot D(t) \cdot \exp j(2\pi ft+2\pi f_0\tau+\phi)+n_2(t)$$

where,
- s1(t) and s2(t) are respectively the satellite signals received by each antenna,
- n1(t) and n2(t) are respectively the noise received by each antenna,
- f is the residual carrier frequency,
- f0 is the carrier frequency received,
- $\phi$ is the initial phase (undetermined) of the signal,
- D(t) is the sign of the data (which may possibly modulate the carrier),
- a is the amplitude of the signal processed,
- τ is the wave propagation delay between the two antennas $$(= \frac{d \cdot \cos(\theta)}{c},$$

separated by d and of angle of incidence θ.

Figure 3:
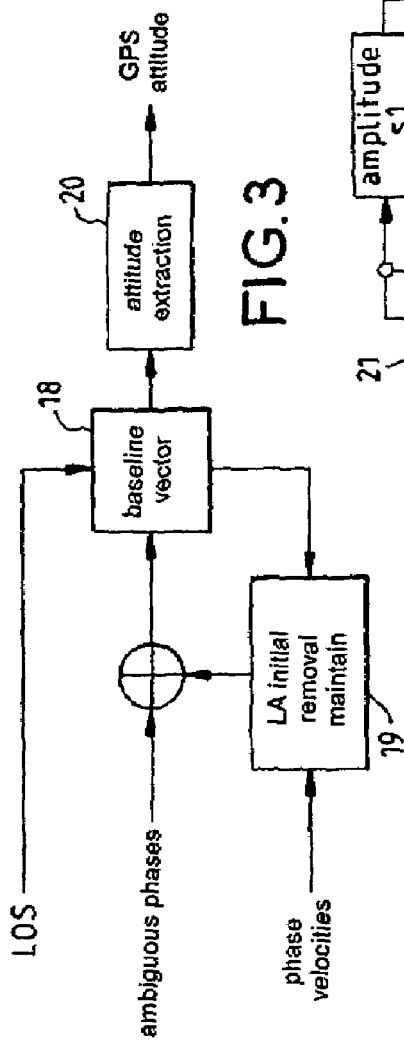
FIG. 3 is a diagram explaining the attitude determination step according to the present invention.

The determination of the attitude is obtained by calculation on the basis of the measurements of ambiguous phases, by adding the previously initialized and maintained ambiguity, then by inverting the projection of the baseline onto the directions of the various satellites, according to the schematic of FIG. 3. The LOSs of the satellites emanate from the "resolved position-velocity-time" (PVT) set resolved by the GPS positioning, and from the "calculated satellite position-velocity" (PVS) set calculated by the receiver on the basis of the navigation data received (ephemerides or almanac) and of the resolved time.

In the diagram of FIG. 3, the baseline vector (18) is determined in accordance with the knowledge of the direction of the satellite (LOS) and of the ambiguous phases, after ambiguity removal (19) carried out (20) on the ambiguous phases and performed on initialization of the device, then maintained in real time, knowing the phase velocities. The attitude of the vehicle (20) and hence the GPS attitude parameters of this vehicle are extracted through the determination of the baseline vector.

The initial LA consists in selecting for each satellite the integer number of wavelengths corresponding to the integer part of the difference in path length of the GPS signal.

On account of the existence of different phase biases in each RF channel of the receiver, practically the double difference of the phase offsets taken on different view axes is produced; this method used conventionally for resolving the differential biases between GPS receivers allows attitude resolution here.

This selection is made in a search domain including at the outset all the possible values of ambiguity. In the absence of a priori knowledge, the domain is bounded for each satellite by the integer number of wavelengths contained in the baseline.

The use of an aid consists in reducing this search interval.

For this purpose, the prediction of this value is given by the use of the following formula (case of a baseline length defined by two antennas, and its geographical angles of pitch and heading):

$$n_{DOMAIN}=E(\overline{u} \cdot \overline{b}_{AID}) \pm dn$$

with $$dn = E\left(\frac{\partial(\overline{u} \cdot \overline{b}_{AID})}{\partial Pi} \cdot dPi\right)$$

where, $$\overline{b}_{AID} = \begin{pmatrix} \cos(pitch_{AID}) \cdot \cos(Heading_{AID}) \\ \cos(pitch_{AID}) \cdot \sin(Heading_{AID}) \\ \sin(pitch_{AID}) \end{pmatrix} * \overline{b}_{BODY}$$

Pi, pitch and heading aid parameters respectively, dPi, a priori uncertainty in the knowledge of the parameter, $b_{BODY}$ being the baseline length of the relevant vehicle.

To improve the robustness and the accuracy of the measurements of phase offset between antennas of a pair of antennas, useful for the determination of attitude, the invention proposes two novel processings:

producing the carrier phase loop (PLL) by summing the two respective signals arising from a pair of close antennas, half a wavelength apart so as to strengthen resistance to interference and while operating at low signal-to-noise ratio. The summation is undertaken with the aid of a signal processing procedure making it possible to render the two signals coherent before summation (by normalized intercorrelation) independently of any bias of the RF chains. This coherence setting endows the PLL with spatial rejection of the multipaths which are not in the privileged direction (moreover, and in a manner already known, this pair of closely spaced antennas may also be useful for a first direct and unambiguous initialization of the attitude), carrying out the measurement of phase offset with the aid of a novel signal processing technique on two signals arising respectively from a pair of antennas sufficiently far apart (several wavelengths, so as to attain good angular accuracy for the attitude measurement). The measurement of phase offset is obtained by passing via the frequency domain, this making it possible to reject signals that are not frequency coherent (doppler multipath shifted by the privileged frequency, etc.).

To perform the summation over two closely spaced antennas, the invention consists in slaving the two respective PLLs of the pair of antennas by the same command arising from a summation of the two signals detected. This summation makes it possible to increase the signal-to-noise ratio seen by the PLL. This summation is previously rendered coherent by canceling the delay of one signal with respect to the other. This delay is firstly measured by normalized complex intercorrelation.

A corollary advantage of this coherence setting is the partial spatial rejection of the signals of multipaths whose directions viewed by the two antennas are not identical to one another.

In detail (see FIG. 4), the invention consists in:
calculating the phase offset by interferometry (normalized intercorrelation 21) between homologous signals, that is to say those that arise from one and the same satellite (S1_0 and S1b_0), and are delivered respectively by the two antennas (22, 23) of one and the same pair of antennas, these antennas being less than $\lambda/2$ apart, then filtered, demodulated and despread (24, 25),
carrying out a coherence resetting by multiplication (26) of the signals (S1_0 and S1b_0) by half the relative delay (27) evaluated by the above normalized intercorrelation. The two signals are previously delayed (28, 29) in such a way as to compensate for the delay introduced by the intercorrelation (20 ms in the present example),
slaving (30) the phase loop PLL on the basis of the vector addition (31) of the two coherence-reset antenna signals. The PLLs are then slaved to the average phase between the two signals respectively received by the two antennas, with a gain of 3 dB in the signal-to-noise ratio.

The coherence resetting of the signals demodulated on the basis of the normalized intercorrelation output (representing a complex signal with argument equal to the instantaneous phase offset, the noise remaining negligible) has the consequence of reducing the effect of the spatially decorrelated noise, in a manner much like a beam-forming "two-patch" type antenna.

After coherence resetting, the signals being summed before slaving the PLL, this summation makes it possible to gain 3 dB in the signal-to-noise ratio in the loop (hence $\sqrt{2}$ in the accuracy of measurement) in the case of Gaussian independent noise, and thus to operate in the presence of correspondingly higher disturbances.

Moreover, any interference signal not arriving in the direction of the signal will be attenuated, but with an effectiveness which depends on the bandwidth of this interference in relation to the distance of separation of the two antennas:

Either, according to the invention, the antennas are closely spaced to better than $\lambda/2$, and in this case the attenuation of a coherent wave is carried out without any other angular ambiguity with regard to any type of interference (narrowband and broadband), Or the antennas are several wavelengths apart, and in this case, the directivity becomes illusory with regard to the narrowband signals, on account of the spatial ambiguities (unambiguous spatial directivity being achievable only in the case of very broadband noise, incompatible with the conventional passband of receivers). This arrangement is not adopted.

To improve the robustness of the phase offset measurements, the invention proposes that an intercorrelation be carried out passing via the frequency domain. Thus, associated with the measurement of phase offset is a processing in the frequency domain by way of a direct fast Fourier transformation (DFT) of the two signals received on the two antennas (antennas 22 and 23A—see FIG. 5), these two signals arising from one and the same satellite. This transformation being followed by a complex product in the frequency domain, by a frequency excision processing for rejecting the signals of abnormal frequency (noncoherent Doppler multipath, etc.) then by an inverse DFT considered at zero time shift (the phase offset between the two carrier signals being measured by the value of the intercorrelation for a zero time shift).

This solution makes it possible to "clean" the spectrum of the demodulated carrier signals, of the unwanted lines or bands that may have been superimposed on the carrier signal (narrowband interference, Doppler-shifted multipaths, etc.).

This processing is carried out at the tempo of the correlation of the code (typically of the order of 1 kHz) after Fourier transformation by FFT of the "I" and "Q" correlation outputs. A method for carrying it out is for example:
normalization of the spectrum (centering and normalization of the standard deviation of the background noise, by sliding windowing, for example, making it possible to estimate the background noise outside of the frequency levels due to the useful signal),
detection of the noise spikes, and identification of the carrier (a priori, of highest and most stable signal-to-noise ratio; typically 10 dB in 1 kHz for GPS),
the suppression of the noise spikes in the frequency domain of the two signals (frequency excision by setting to zero or to the level of the background noise of the spectral amplitudes at the frequencies detected),
the complex multiplication of the filtered conjugate spectra (intercorrelation),
the return to temporal by inverse DFT considered at zero, so as to obtain the intercorrelation between the two signals and hence their relative phase offset.

The advantage of this procedure is that it allows the calculation of the phase offsets in a relatively wide band compatible with considerable dynamic swings (without having to integrate further measurement), by benefiting from elimination of the noise that may appear in the band.

Figure 5:
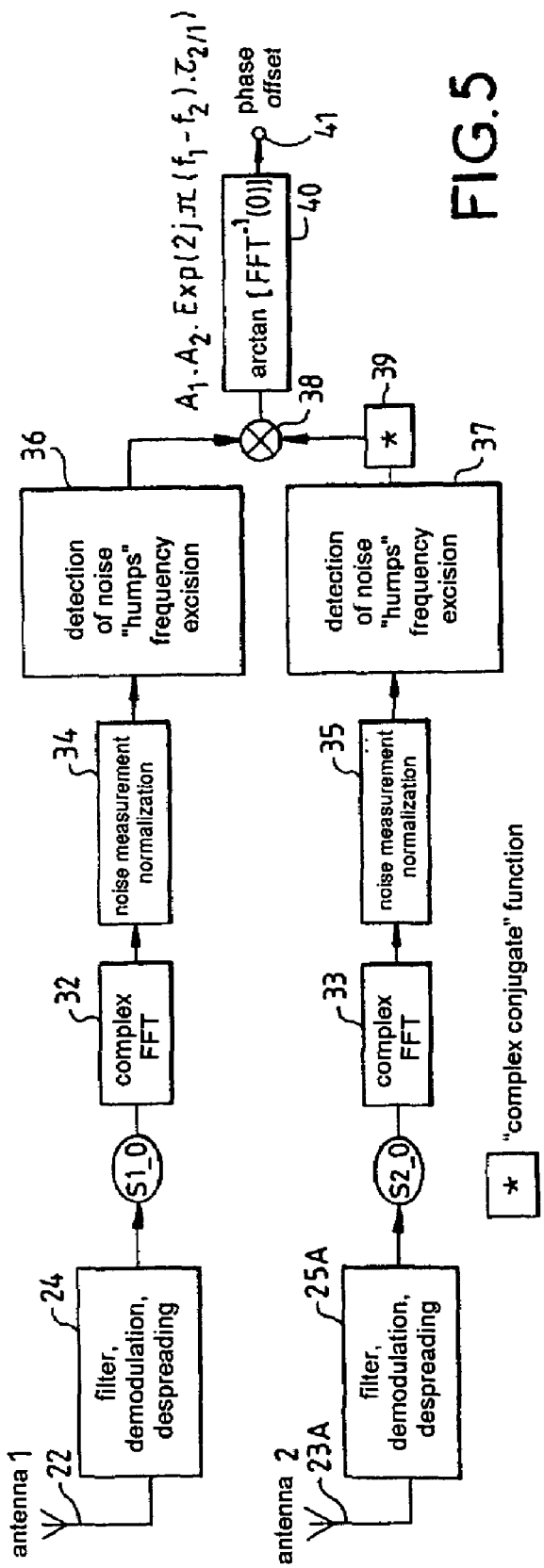
FIG. 5 is a diagram illustrating the phase offset measurement processing with frequency excision, in accordance with the invention.

In detail, as represented in FIG. 5, the invention consists in:
carrying out the Fourier transforms (32, 33), for example by 128-point FFT, of the two signals (sampled at around 1 kHz)
carrying out suppression of the noise (34, 35) of each of the two complex spectra obtained, and including spectrum normalization conducted by means of a sliding window serving as noise calculation reference (typically 2×10 points in the case of an FFT with 128 points)
detection of the noise humps (36, 37) on the basis of the normalized spectrum, and the determination of the carrier line and of its trail (with regard to a criterion of level and stability of the signal/noise ratio and of its frequency position), and elimination of the humps identified with noise or multipaths, jointly on the two spectra
carrying out an intercorrrelation by complex product (38) of the spectra (the second signal being conjugate: 39)
carrying out the calculation of its argument at zero shift (for the zero abscissa) by a complex inverse DFT (40), so as to express the differential phase (41) between the two starting signals. The date of validity of this measured phase is synchronous with the middle of the analysis time interval (20 ms for example).

For a typical signal-to-noise ratio of 40 dBHz, the accuracy thus obtained is of the order of 0.5° at 5 Hz (5° at 50 Hz).

Figure 4:
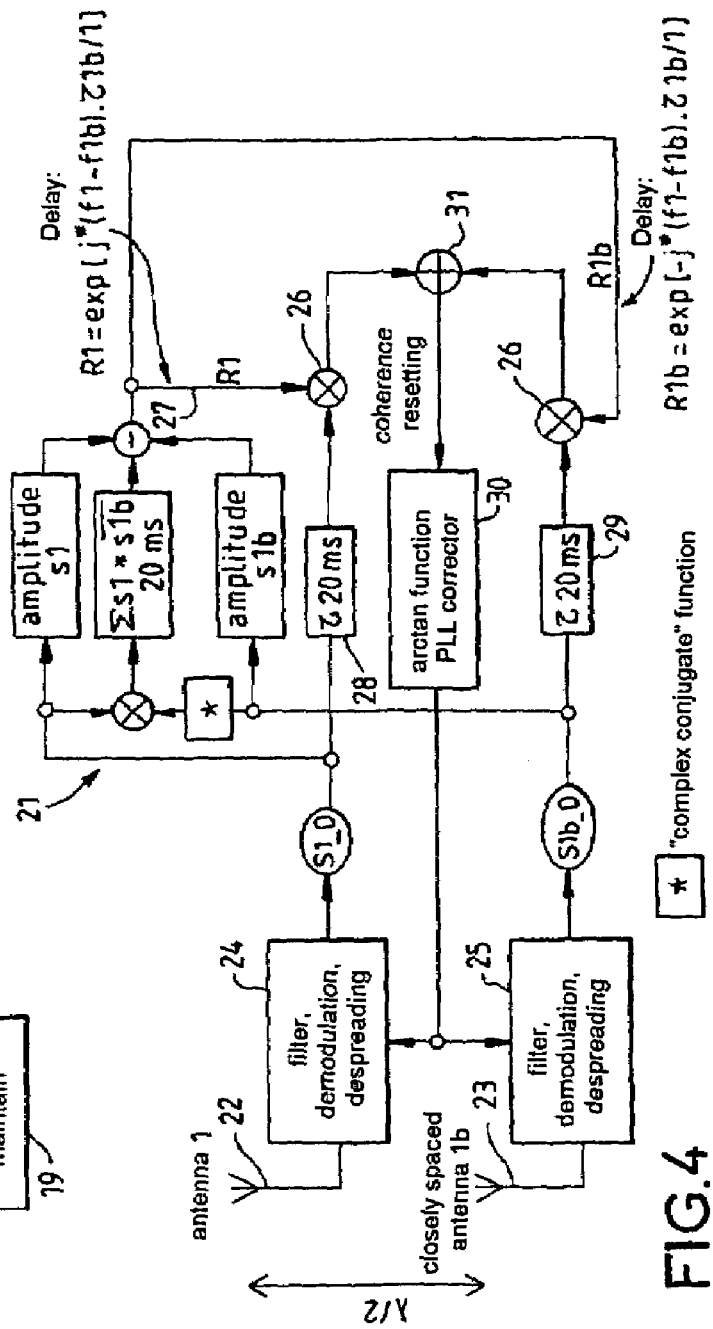
FIG. 4 is a diagram illustrating the robust PLL measurement processing in accordance with the invention.
Figure 6:
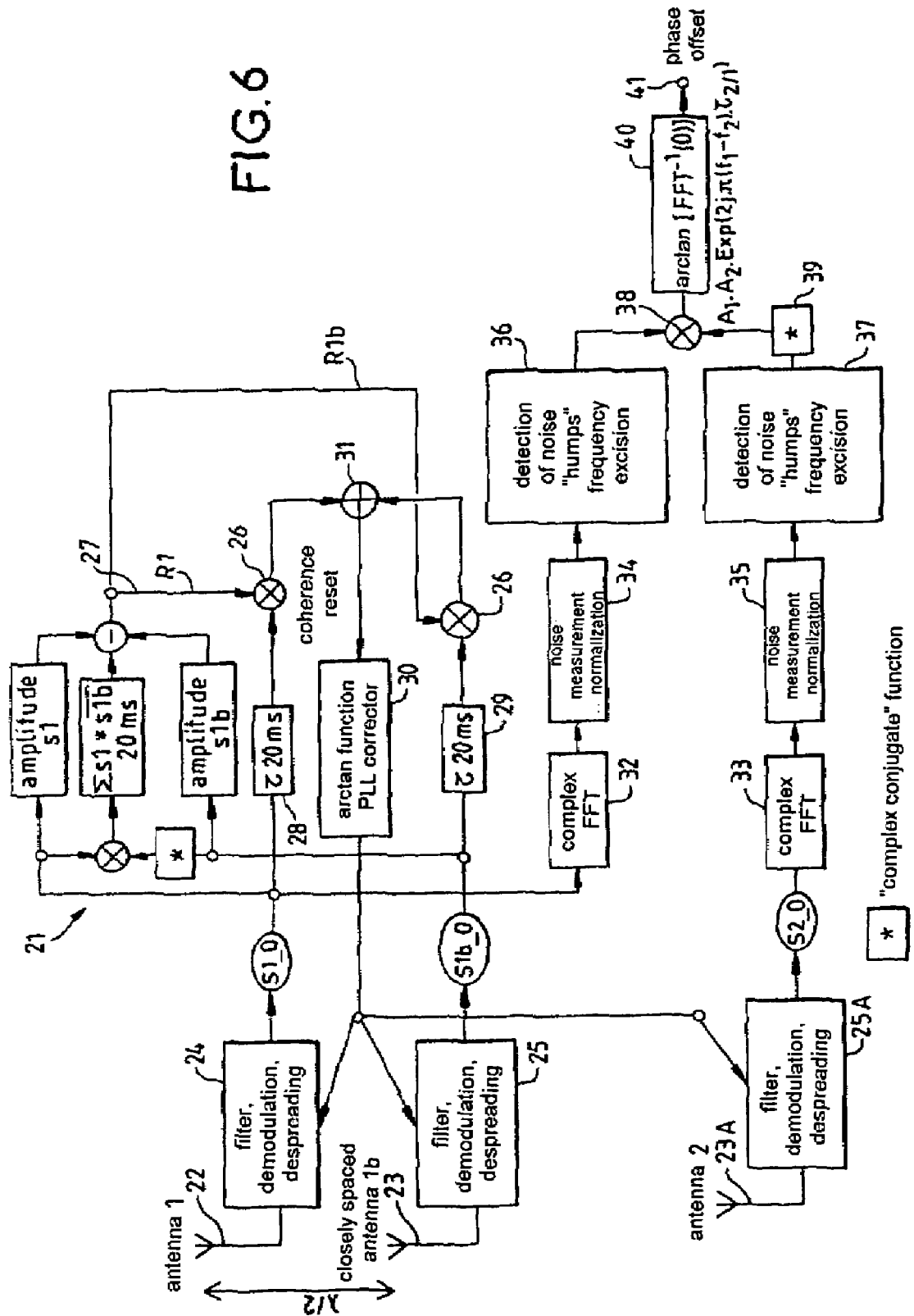
FIG. 6 is a diagram illustrating the processing of accurate measurement of phase offset with robust PLL, in accordance with the invention.

FIG. 6, combining FIGS. 4 and 5, presents the complete processing in the receiver, for the accurate phase offset measurement with robust PLL. In this figure, the same elements as those of FIGS. 4 and 5 are assigned like numerical references.

The part of the method of the invention pertaining to the removal of ambiguity with partial aid will now be described.

In the case of partial aid (no heading aid) the invention consists, in respect of the preselection of the domain of potential ambiguities in:

defining a first domain of ambiguity search by two particular hypotheses regarding the aid heading, and by using the other known aids.

then widening this domain with the uncertainties regarding the other aid parameters.

Thus, the search domain is reduced, even in the case of partial aid, thus optimizing the initialization time and the robustness of the determination of attitude by GPS.

These particular a priori heading hypotheses are the following and correspond to:

aid heading equal to the azimuth of the satellite (maximum of the scalar product of projection of the antenna baseline onto this direction)

aid heading equal to the azimuth of the satellite +180° (projection minimum).

Figure 7:
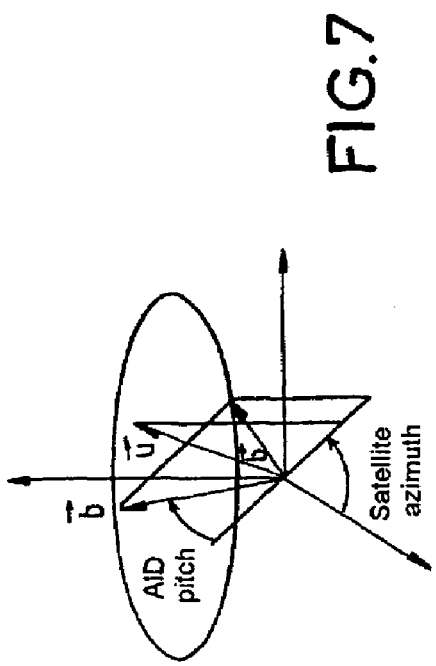
FIG. 7 is a diagram illustrating the first step of defining an ambiguity removal search domain without heading aid, in accordance with the invention.

FIG. 7 illustrates the first step of defining the domain: in this figure, the azimuth and aid pitch vectors of the relevant satellite have been labeled, as have the vectors $\overline{b}$ and $\overline{u}$ defined previously.

We then have:

$$n_{MIN} = E(\overline{u} \cdot \overline{b}_{AID}(\text{Pitch}_{AID}, \text{Azimuth}_{SATELLITE} + \pi))$$

$$n_{MAX} = E(\overline{u} \cdot \overline{b}_{AID}(\text{Pitch}_{AID}, \text{Azimuth}_{SATELLITE}))$$

The widening of the domain is then given by:

$$n_{MIN} = n_{MIN} - dn$$

$$n_{MAX} = n_{MAX} + dn$$

where $$dn = E\left(\frac{\partial(\overline{u} \cdot \overline{b}_{AID})}{\partial Pi} \cdot dPi\right)$$

and Pi aid parameters still available (accelerometric pitch)

In the case of a short complementary baseline, the present invention affords a solution to the problem of ambiguity transfer on the long baseline in the presence of propagation bias.

In fact, the following proof shows that the use, applied to this configuration of three antennas (long baseline+short baseline: see in FIG. 6 the antennas 22, 23 and 23A), of double differences instead of simple differences makes it possible to remove the ambiguity with regard to the phase directly, or to reduce it to a few units if the RF propagation delay is greater than half a wavelength. The ambiguity with regard to the phase offset on the long baseline being resolved, it is then possible to calculate the attitude of the carrier.

Having obtained the attitude of the carrier, it is then possible to reconstitute (by inverting the estimation) the RF propagation bias on the short and long baselines (by estimating the difference between the inter-antenna phase offset measurements and the theoretical phase offset measurements reconstituted through the estimation of the attitude).

This method makes it possible to compensate for the differences in path length of the wave between antennas with sufficient accuracy, so as to improve the signal-to-noise ratio in the direction of the satellites, and (as a natural spinoff) to diminish the effect of the space correlated interference sources.

The ratio between the phase offsets between the antennas 1 and 2 (D12 apart) and 1 and 3 (D13 apart), may be written:

$$\Delta\varphi_{12} = \Delta\varphi_{13} \times \frac{D_{12}}{D_{13}} \tag{1}$$

and, for a satellite i:

$$\Delta\phi_{13i} = 2n_i\pi + \delta\phi_{13i} + \Phi_{13}$$

$$\Delta\phi_{12i} = \delta\phi_{12i} + \Phi_{12}$$

likewise for a satellite j:

$$\Delta\phi_{13j} = 2n_j\pi + \delta\phi_{13j} + \Phi_{13}$$

$$\Delta\phi_{12j} = \delta\phi_{12j} + \Phi_{12}$$

$\delta\phi_{13j}$: phase_offset_measured-on_long_baseline
$\delta\phi_{12j}$: phase_offset_measured-on_short_baseline
$\Phi_{13}$: RF_bias_long_baseline
$\Phi_{12}$: RF_bias_short_baseline
$n_j$: long_baseline_phase_measurement_ambiguity $$\Delta\varphi_{12i} = \delta\varphi_{12i} + \phi_{12} = \Delta\varphi_{13i} \times \frac{D_{12}}{D_{13}} = \tag{1}$$

$$(2n_i\pi + \delta\varphi_{13i} + \phi_{13}) \times \frac{D_{12}}{D_{13}} \Rightarrow \delta\varphi_{12i} + \phi_{12} - \phi_{13} \times \frac{D_{12}}{D_{13}} =$$

$$\Delta\varphi_{13i} \times \frac{D_{12}}{D_{13}} = (2n_i\pi + \delta\varphi_{13i} + \phi_{13}) \times \frac{D_{12}}{D_{13}}$$

likewise, for a satellite j:

$$\delta\varphi_{12j} + \phi_{12} - \phi_{13} \times \frac{D_{12}}{D_{13}} = (2n_j\pi + \delta\varphi_{13j} + \phi_{13}) \times \frac{D_{12}}{D_{13}}$$

yielding the expression for the double difference:

$$\Delta\varphi_{12i} - \Delta\varphi_{12j} =$$

$$\delta\varphi_{12i} - \delta\varphi_{12j} = (2(n_i - n_j)\pi + \delta\varphi_{13i} - \delta\varphi_{13j}) \times \frac{D_{12}}{D_{13}}(n_i - n_j) =$$

$$\frac{1}{2\pi}\left[(\Delta\varphi_{12i} - \Delta\varphi_{12j}) \times \frac{D_{13}}{D_{12}} - (\delta\varphi 13_i - \delta\varphi 13_j)\right]$$

An important advantage of this procedure based on the use of the three antennas cited is of allowing direct resolution of ambiguities with regard to the simple measurements of phase offset independently of the phase biases of the RF chains.

Any other procedure based on only two antennas makes it necessary to work on the double differences of inter-satellite phases, which reduces the signal-to-measurement noise ratio by 3 dB.

On account of the phase measurement uncertainties, the above solution is in fact contained within the measurement uncertainty intervals (made bigger on account of the projection of the lengths); however, it will be possible to limit oneself to only a few ambiguities (+/−1 for example in nominal phase noise, around 5 mm)

This direct resolution of the ambiguities, without external aids, allows the calculation of the attitude, then permits the calibration of the RF delays ($\Phi_{13}$, $\Phi_{12}$)

Once the search domain has been defined, it is necessary to have a reliable LA procedure. The present invention proposes an improvement of the LA, by virtue of a novel statistical evaluation criterion. This novel procedure also devises a criterion for evaluating the resolved ambiguity.

The principle is as follows:
the (unambiguous) measurements of phase offset and the carrier attitude are linked by linear transformation, H, dependent on the geometry of the viewing axes of the satellites,
the calculation of the attitude on the basis of all the combinations of phase ambiguity leads for each hypothesis to a vector of phase measurement residuals (offset between the phase offset measured and the reconstituted theoretical phase offset), these phase residuals are normalized by their estimated standard deviation (dependent on the inaccuracy of the elementary measurements of phase offset and of the reconstituted phase offsets). They are indicative of the distance existing between the estimated attitude and
the actual attitude (under the hypothesis that no measurement is erroneous),
under the hypothesis that the phase measurement noise follows a Gaussian distribution, it is then possible to apply a quadratic detection test, according to a Khi-2 law (sum of the squares of the weighted standard deviations over the various satellite axes, and possibly integrated over several time recurrences),
the competing solutions are selected on the basis of a threshold which depends on the chosen probabilities of detection and of false alarm, which depend on the Khi-2 law,
and in the case where several solutions still compete, an extra test of residuals pertaining to the apparent baseline length of the attitude solution is carried out,
if despite everything some candidate solutions still remain (related to the unobservability of the solutions), another subset of visible satellites should be tested (this makes it possible to discard an error of a collection of satellites).

According to variants of the method of the invention, for greater robustness of the phase measurement, it is possible to use simultaneously:

closely spaced antennas (or elements of a CRPA type multiantenna) allowing better elimination of the spatially coherent sources of noise, and usable to initialize the ambiguity removal, distantly spaced antennas making it possible to carry out accurate phase offset measurements initialized on the basis of the closely spaced antennas, or of any other inertial means of attitude calculation.

For greater robustness of the ambiguities selection test, the search domain can be widened by a few extra ambiguities:
one or two ambiguities to compensate for the truncations due to the integer part calculations,
one ambiguity for the measurement noise regarding the fractional part of the interferometric phase.

In order to improve the integrity check, the test can be applied over several recurrences of the attitude measurements (thereby reducing the repetition rate).

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of improving the determination of the attitude of a vehicle with the aid of radionavigation signals, implemented with the aid of at least one pair of antennas, comprising the steps of:
producing a carrier phase loop by summing the two signals arising from a pair of antennas half a wavelength apart, these signals being rendered coherent before summation,
carrying out a measurement of phase offset with regard to the signals arising from a pair of antennas several wavelengths apart, going via the frequency domain;
performing a reduction of the initial ambiguity removal search domain for the determination of attitude of a vehicle by interferometric GPS measurement; and
implementing a statistical test for the selection of the ambiguity.

2. The method as claimed in claim 1, wherein to produce a carrier phase loop, the phase offset is calculated by interferometry between homologous signals, the signals arising from one and the same satellite and are delivered respectively by two antennas of a pair of antennas, being less than $\lambda/2$ apart, and then filtered, demodulated and despread, a coherence reset is carried out by multiplication of one of the signals by the relative delay evaluated by the above normalized intercorrelation, the two signals previously being delayed in such a way as to compensate for the delay introduced by the intercorrelation, and that the phase loop PLL is slaved on the basis of the vector addition of the two coherence-reset antenna signals.

3. The method as claimed in claim 2, wherein in order to carry out a measurement of the phase offset, an intercorrelation is carried out going via the frequency domain.

4. The method as claimed in claim 2, wherein in order to reduce the search domain, with partial aid, for the preselection of the domain of potential ambiguities, one defines a first domain of ambiguity search by two particular hypotheses regarding the aid heading, and using the other known aids, then this domain is widened with the uncertainties regarding the other aid parameters.

5. The method as claimed in claim 2, wherein in order to improve the measurement of phase offset, simultaneous use is made of closely spaced antennas and of distantly spaced antennas making it possible to carry out accurate measurements of simple phase offset, as opposed to double differences, that are unambiguous and unaffected by RF phase biases and are initialized on the basis of the closely spaced antennas, or of any other inertial means of attitude calculation.

6. The method as claimed in claim 2, wherein in order to increase the robustness of the ambiguities selection test, the search domain is widened by a few extra ambiguities.

7. The method as claimed in claim 1, wherein in order to carry out a measurement of the phase offset, an intercorrelation is carried out going via the frequency domain.

8. The method as claimed in claim 7, wherein in order to carry out the intercorrelation processing, after Fourier transformation by FFT of the "I" and "Q" correlation outputs, a normalization of the spectrum is performed by centering and normalization of the standard deviation of the background noise, by sliding windowing, followed by a detection of the noise spikes, and identification of the carrier, followed by the suppression of the noise spikes in the frequency domain of the two signals by frequency excision by setting to zero or to the level of the background noise of the spectral amplitudes at the frequencies detected, followed by the complex multiplication of the filtered conjugate spectra (intercorrelation) and the return to temporal by inverse DFT considered at zero, so as to obtain the intercorrelation between the two signals and hence their relative phase offset.

9. The method as claimed in claim 8, wherein in order to reduce the search domain, with partial aid, for the preselection of the domain of potential ambiguities, one defines a first domain of ambiguity search by two particular hypotheses regarding the aid heading, and using the other known aids, then this domain is widened with the uncertainties regarding the other aid parameters.

10. The method as claimed in claim 8, wherein in order to improve the measurement of phase offset, simultaneous use is made of closely spaced antennas and of distantly spaced antennas making it possible to carry out accurate measurements of simple phase offset, as opposed to double differences, that are unambiguous and unaffected by RF phase biases and are initialized on the basis of the closely spaced antennas, or of any other inertial means of attitude calculation.

11. The method as claimed in claim 8, wherein in order to increase the robustness of the ambiguities selection test, the search domain is widened by a few extra ambiguities.

12. The method as claimed in claim 1, wherein in order to reduce the search domain, with partial aid, for the preselection of the domain of potential ambiguities, one defines a first domain of ambiguity search by two particular hypotheses regarding the aid heading, and using the other known aids, then this domain is widened with the uncertainties regarding the other aid parameters.

13. The method as claimed in claim 12, wherein, if no heading aid is available, the particular hypotheses are: aid heading equal to the azimuth of the satellite, that is to say maximum of the scalar product of projection of the antenna baseline onto this direction, and aid heading equal to the azimuth of the satellite +180°, that is to say the projection minimum.

14. The method as claimed in claim 12, wherein in order to improve the measurement of phase offset, simultaneous use is made of closely spaced antennas and of distantly spaced antennas making it possible to carry out accurate measurements of simple phase offset, as opposed to double differences, that are unambiguous and unaffected by RF phase biases and are initialized on the basis of the closely spaced antennas, or of any other inertial means of attitude calculation.

15. The method as claimed in claim 12, wherein in order to improve the integrity check, the test is applied over several recurrences of the attitude measurements.

16. The method as claimed in claim 1, wherein in order to improve the measurement of phase offset, simultaneous use is made of closely spaced antennas and of distantly spaced antennas making it possible to carry out accurate measurements of simple phase offset, as opposed to double differences, that are unambiguous and unaffected by RF phase biases and are initialized on the basis of the closely spaced antennas, or of any other inertial means of attitude calculation.

17. The method as claimed in claim 16, wherein in order to increase the robustness of the ambiguities selection test, the search domain is widened by a few extra ambiguities.

18. The method as claimed in claim 1, wherein in order to increase the robustness of the ambiguities selection test, the search domain is widened by a few extra ambiguities.

19. The method as claimed in claim 18, wherein the extra ambiguities are: one or two ambiguities to compensate for the truncations due to the integer part calculations and one ambiguity for the measurement noise regarding the fractional part of the interferometric phase.

20. The method as claimed in claim 1, wherein in order to improve the integrity check, the test is applied over several recurrences of the attitude measurements.

* * * * *